United States Patent Office 3,375,264
Patented Mar. 26, 1968

3,375,264
3-ALKOXY OR ALKYLTHIO-4,4'-DIISOCYANATO DIPHENYLMETHANES
Adnan A. R. Sayigh, North Haven, James N. Tilley, Cheshire, and Henri Ulrich, Northford, Conn., assignors to The Upjohn Company, Kalamazoo, Mich., a corporation of Delaware
No Drawing. Filed Sept. 14, 1964, Ser. No. 396,409
3 Claims. (Cl. 260—453)

ABSTRACT OF THE DISCLOSURE 4,4'-diisocyanato diphenylmethanes, substituted in the 3-position by lower-alkoxy or lower-alkylthio, are provided. The isocyanato group in the same ring as the 3-substituent is markedly less reactive than that in the unsubstituted ring thus permitting selective reaction of said isocyanate groups. The compounds are useful as intermediates in the preparation of cellular and non-cellular polyurethanes.

---

This invention relates to novel organic isocyanates and processes for their preparation and is more particularly concerned with novel 3-substituted 4,4'-methylenediphenylene diisocyanates, and with processes for their preparation.

The novel compounds of the invention can be represented by the following formula:

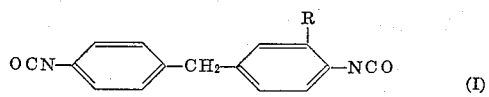

wherein R is selected from the group consisting of lower-alkoxy and lower-alkylthio.

The term "lower-alkoxy" means alkoxy containing from 1 to 8 carbon atoms, inclusive, such as methoxy, ethoxy, propoxy, butoxy, pentyloxy, hexyloxy, heptyloxy, octyloxy, and isomeric forms thereof. The term "lower-alkylthio" means alkylthio containing from 1 to 8 carbon atoms, inclusive, such as methylthio, ethylthio, propylthio, butylthio, pentylthio, hexylthio, heptylthio, octylthio, and isomeric forms thereof.

The novel compounds of the invention having the Formula I are useful as intermediates in the preparation of cellular and non-cellular polyurethanes in accordance with procedures known in the art; see, for example, Dombrow, "Polyurethanes," Reinhold Publishing Corporation, New York, pp. 1–105 (1957). Diisocyanates are now widely used in the preparation of many different types of polyurethane including flexible and rigid foams, elastomers, coatings, molding compounds and adhesives. In the diisocyanates most frequently used, such as 4,4'-methylene diisocyanate, 2,4-tolylene diisocyanate, 2,6-tolylene diisocyanate, hexamethylene diisocyanate, and the like, both isocyanate groups are highly reactive and enter into reaction with an active hydrogen containing group such as hydroxy, amino, carboxy and the like. While this high reactivity has its obvious advantages in the utilisation of said diisocyanates to produce polyurethanes it also has certain disadvantages. Thus the diisocyanates in question are difficult to store for prolonged periods due to the need to exclude moisture and other active hydrogen containing materials with which the isocyanato moieties would react. Further, prepolymers prepared from said diisocyanates, i.e. polymers obtained by reacting the diisocyanate with less than an equivalent amount of a polyol so that the resulting polymer still contains free isocyanato groups and can be reacted with active hydrogen containing compounds in a subsequent step to form the desired end-product, are also unstable due to the remaining high reactivity of the unreacted isocyanate groups. In addition, the high rate of reaction of the isocyanate groups makes it necessary to employ rigorously controlled reaction conditions in the formation of polyurethanes therefrom in order to obtain uniform products in which undesirable side-reactions have been reduced to a minimum.

Numerous attempts to overcome this problem have been reported in the art. Most frequently the isocyanate groups have been blocked by the formation of adducts with phenols or with compounds containing an active methylene group such as acetoacetic ester, diethyl malonate, lactams, imides, tertiary alcohols, secondary amines, mercaptans, and the like. The free isocyanato groups are regenerated, most often by heating, before the isocyanate is to be used. Such methods have obvious drawbacks and, in particular, the necessity to heat the isocyanate adduct is undesirable in many instances because of the adverse effect of heat on the structure of the polymers. Further, the blocking material regenerated from the adduct with the diisocyanate becomes incorporated as extraneous material in the resulting polyurethane.

Attempts have also been made to reduce the reactivity of one or both isocyanate groups in the diisocyanate by modifying the structure of the isocyanate so that one or both isocyanate groups is attached directly to a tertiary carbon atom; see, for example, U.S. Patents 2,723,265 and 2,729,666. Unfortunately the isocyanate groups in the compounds so modified have been so reduced in activity that application of considerable heat is necessary in order to achieve reaction between the diisocyanate and polyol in the formation of polyurethanes.

The shortcomings of the previously reported methods of blocking or reducing the activity of isocyanates have been avoided in the novel compounds of the invention having the Formula I in which the reactivity of one of the isocyanato groups, i.e. that in the disubstituted benzene nucleus, is reduced by the presence of the vicinal lower-alkoxy or lower-alkylthio substituent. The combined steric and electromeric effects of such lower-alkoxy or lower-alkylthio substituent decrease the reactivity of the vicinal isocyanato group sufficiently to make it possible to react the two isocyanato groups separately and selectively and yet to complete the reaction of both groups at temperatures substantially below those required for reaction of the blocked or hindered isocyanate groups described in the prior art.

The novel compounds of the Formula I can be prepared by phosgenation of the corresponding diamines having the formula:

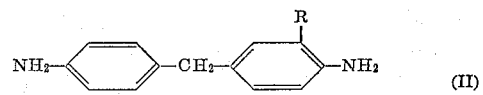

wherein R is as hereinbefore defined. The phosgenation is carried out by procedures known in the art. For example, the free diamine (II) or an acid addition salt thereof, such as the dihydrochloride, dihydrobromide and the like, is treated with phosgene in the presence of an inert organic solvent such as benzene, toluene, xylene, naphthalene, decalin, chlorobenzene, o-dichlorobenzene, bromobenzene, o-chlorotoluene, and the like. The reaction is conducted advantageously at elevated temperatures and preferably at temperatures of the order of 150° to 200° C. The phosgene is conveniently employed in approximately stoichiometric proportions but an excess of phosgene can be employed if desired. In a modification of the above process the free diamine (II) in an inert organic solvent, as exemplified above, is treated with carbon dioxide to form the corresponding carbonate and then the latter is reacted with phosgene as described above. The above methods of phosgenation are well described and summarised by Siefken, Annalen, 562, 75 et seq. (1949).

The novel diamines of the Formula II which are employed as intermediates in the above reaction can be prepared by a variety of methods. For example, the diamines (II) can be prepared by condensation of 4-aminobenzylaniline with the appropriately o-substituted aniline

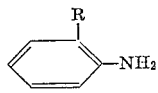

wherein R is as hereinbefore defined. Advantageously the conditions employed are those described by Cohn, Ang. Chem. 14, 363, 1901, wherein the reactants are heated together in aqueous mineral acid. The diamine (II) thus formed is frequently contaminated with appreciable quantities of 4,4′ - diaminodiphenylmethane formed by the acid catalysed rearrangement of the 4 - aminobenzylaniline employed as starting material. The formation of the undesired 4,4′ - diaminodiphenylmethane can be minimised by employing a large excess of the o-substituted aniline, and the mixture of the desired diamine (II) and the undesired diamine can be separated by conventional procedures, for example, by recrystallisation in the case of solids, fractional distillation in the case of liquids or low melting solids, chromatography, and the like.

In an alternative method for the preparation of the diamines (II) an α - halo - 4 - nitrotoluene having the formula:

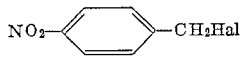

wherein Hal represents halogen, preferably chlorine or bromine, is condensed with the appropriate o-substituted aniline having the formula:

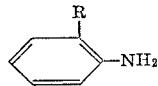

wherein R is as hereinbefore defined. The condensation can be represented by the following equation:

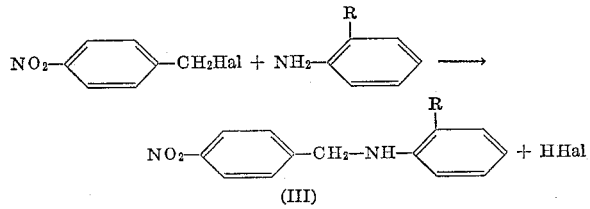

wherein Hal and R are as hereinbefore defined. The condensation is carried out advantageously using the procedure described by Paal and Benker, Ber. 32, 1253, 1899, for the preparation of the known compound N - (4-nitrobenzyl) - o - anisidine.

The nitrocompound (III) is then hydrogenated to form the corresponding amine using procedures known in the art for the reduction of nitro groups, for example, by hydrogenation in the presence of a catalyst such as Raney nickel, platinum oxide, palladium-on-charcoal and the like. The amine so obtained has the following structure:

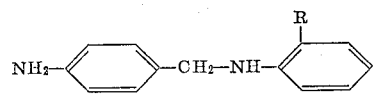

wherein R is as hereinbefore defined, and is readily converted to the required diamine (II) by acid catalysed rearrangement, for example, by treatment with aqueous mineral acid. The desired diamine (II) is isolated from the reaction mixture by conventional procedures, for example, by neutralisation of the reaction mixture followed by filtration or solvent extraction. The diamine (II) so obtained can be purified, if necessary, by known procedures such as recrystallisation, distillation and the like.

Yet another alternative procedure for the preparation of the diamines (II) comprises the aminomethylation of aniline by reaction of the latter with an azomethine derivative according to the following equation:

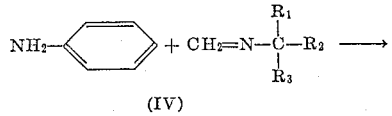

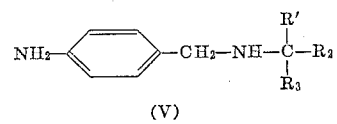

wherein $R_1$, $R_2$ and $R_3$ are selected from the class consisting of (a) lower-alkyl, i.e. alkyl from 1 to 8 carbon atoms, inclusive, such as methyl, ethyl, propyl, butyl, pentyl, hexyl, heptyl, octyl, and isomeric forms thereof, (b) aralkyl from 7 to 13 carbon atoms, inclusive, such as benzyl, phenethyl, phenylpropyl, benzhydryl and the like, and (c) aryl from 6 to 12 carbon atoms, inclusive, such as phenyl, tolyl, xylyl, naphthyl, biphenylyl, and the like. The preferred azomethines for use in the above reaction are those wherein $R_1$ $R_2$ and $R_3$ each represent lower-alkyl.

The above aminomethylation reaction is conducted under conditions well-recognised in the art. For example, the azomethine and the aniline, preferably in the form of an acid addition salt are admixed in approximately stoichiometric proportions in the presence of an inert organic solvent such as benzene, toluene, xylene and the like. Reaction generally takes place without the application of external heat and in many cases the reaction is exothermic and requires external cooling to control it. The product (V) separates from the reaction mixture in the form of its acid addition salt and can be purified if desired.

The azomethines (IV) employed as reactants in the above process can be prepared by procedures known in the art such as that described in U.S. Patent 2,582,128.

The aminomethyl substituted aniline (V) obtained as described above is then condensed with the appropriate o-substituted aniline using the procedures described by Cohn, supra, for the condensation of 4 - aminobenzylaniline and an o-substituted aniline, to obtain the desired diamine (II).

The diamines (II) which are employed as intermediates in the formation of the compounds (I) of the invention are also useful, in accordance with U.S. Patents 1,915,334 and 2,075,359 in forming amine fluosilicate mothproofing agents, and in accordance with U.S. Patents 2,425,320 and 2,606,155 in forming amine thiocyanate formaldehyde condensation products for use as pickling inhibitors. The diamines (II) are also useful in the preparation of dyestuffs using procedures well-recognised in the art; see, for example, Sidgwick, Organic Chemistry of Nitrogen, Oxford University Press, 1942, page 96 et seq.

The compounds (I) of the invention are for the most part stable liquids at room temperature. This is a definite advantage over previously known diarylmethane diisocyanates which are generally solids at ambient temperatures (ca. 20° C.). The ortho substituent in the compounds of Formula I reduces the reactivity of the compounds sufficiently to retard dimerization or trimerization on standing for prolonged periods. The isocyanato group on the unsubstituted phenyl ring readily reacts with active hydrogen compounds at room temperature to yield a prepolymer when then, at elevated temperatures, undergoes further reaction to completion at the hindered, less reactive, isocyanato group adjacent to the hereinbefore described substituent.

The products of this invention offer the advantage of a liquid diphenylmethane diisocyanate with a slow reacting isocyanato group. The slow rate of reaction of the isocyanato group adjacent to the alkoxy or alkylthio group in the compound (I) makes compounding in a two-step system possible. Further, reactions proceed at an easily controlled rate and greater regularity in the polymer structue is attained resulting in enhanced physical properties. Also, exclusion of moist air in the formulation is less critical. The low vapor pressure of the products of this invention minmizes the hazards normally associated with the use of liquid diisocyanates.

The following examples describe the manner and process of making and using the invention and set forth the best mode contemplated by the inventors of carrying out the invention but are not to be construed as limiting.

EXAMPLE 1

*3-methoxy-4,4'-diisocyanatodiphenylmethane*

A. 3-METHOXY-4,4'-DIAMINODIPHENYLMETHANE

To 100 g. of o-anisidine in a mixture of 1100 ml. of concentrated hydrochloric acid and 2 liters of water, was added 257 g. of N-(4-aminobenzyl)aniline dropwise at reflux temperature and when the addition was complete the reaction mixture was refluxed for a period of 18 hours. After neutralization with 25% aqueous sodium hydroxide the organic layer was separated from the water and distilled under vacuum. There was thus obtained 167.3 g. (57% yield) of 3-methoxy-4,4'-diaminodiphenylmethane having a boiling point of 183 to 201° C./0.2 mm., and a melting point (after recrystallization from isopropanol) of 93° C. The infrared spectrum demonstrated that the thus obtained compound was free of 3,3'-dimethoxy-4,4'-diaminodiphenylmethane.

B. 3-METHOXY-4,4'-DIISOCYANATODIPHENYLMETHANE

Gaseous hydrogen chloride was passed into a solution of 150 g. of 3-methoxy-4,4'-diaminodiphenylmethane prepared as described above in 1500 ml. of o-dichlorobenzene, with stirring until the exothermic reaction ceased. A small amount of water was removed by azeotropic distillation and the suspension of the dihydrochloride of the starting amine was treated with phosgene at a temperature of about 160° C. After the equivalent amount of phosgene was consumed, a clear solution resulted. The reaction mixture was purged with nitrogn for a period of about 2 hours to remove excess phosgene. The solvent was removed from the reaction mixture by distillation and the remaining material was distilled under vacuum to give 158.1 g. (86% yield) of colorless 3-methoxy-4,4'-diisocyanatodiphenylmethane having a boiling point of 192° C. at 0.8 mm. of mercury and a refractive index ($n_D^{25.5}$) of 1.5977. The calculated —NCO equivalent: 140; Found: 138.9.

EXAMPLE 2

*3-methoxy-4,4'-diisocyanatodiphenylmethane*

A. N-(4-AMINOBENZYL)-O-ANISIDINE

A mixture of 10 g. of N-(4-nitrobenzyl)-o-anisidine (prepared by the condensation of o-anisidine and 4-nitrobenzyl chloride) in 150 ml. of ethyl acetate and approximately 3 g. of Raney nickel catalyst was treated with hydrogen in a Parr apparatus. The calculated amount of hydrogen was consumed in a period of about 10 hours. The catalyst was filtered from the reaction mixture and the filtrate was evaporated to dryness to give 7.8 grams (89%) yield of N-(4-aminobnzyl)-o-anisidine having a melting point of 58 to 59° C. Recrystallization from aqueous methanol gave white needles melting at 62° C.

B. 3-METHOXY-4,4'-DIAMINODIPHENYLMETHANE

To 6.8 g. of N-(4-aminobenzyl)-o-anisidine prepared as described above in 50 ml. of water, was added 6 g. of concentrated hydrochloric acid and the reaction mixture was refluxed for a period of about 20 hours. After neutralization with 25% sodium hydroxide the reaction mixture was steam distilled to obtain 0.2 g. of unreacted N-(4-aminobenzyl)-o-anisidine. The residue remaining after steam distillation was extracted with ether. The ether extract was evaporated and the residue was subjected to vacuum distillation to give 4.1 g. (60% yield) of 3-methoxy-4,4'-diaminodiphenylmethane as a white solid with a melting point of 83 to 85° C., identical with the material prepared as described in Example 1.

C. 3-METHOXY-4,4'-DIISOCYANATODIPHENYLMETHANE

Using the procedure of Example 1, part B, the 3-methoxy-4,4'-diaminodiphenylmethane obtained as described above was converted to 3-methoxy-4,4'-diisocyanatodiphenylmethane.

EXAMPLE 3

*3-methoxy-4,4'-diisocyanato diphenylmethane*

A. 3-METHOXY-4,4'-DIAMINODIPHENYLMETHANE

To a solution of 13.8 g. of tert.-butylazomethine (prepared as in U.S. Patent 2,582,128) in 100 ml. of benzene, was added 21 g. of aniline hydrochloride slowly with cooling and stirring. The reaction mixture became viscous and yellow. After stirring for a period of one hour the precipitate which had separated was isolated by filtration to give 27 g. (78% yield) of N-(4-aminobenzyl)-tert-butylamine hydrochloride. A portion of this material was treated with slight excess of ammonium hydroxide and the free base N-(4-aminobenzyl)-tert-butylamine having a melting point of 142 to 144° C. was obtained.

A mixture of 72 g. of o-anisidine, 130 ml. of concentrated hydrochloric acid, 250 ml. of water, and 21.5 g. of 4-aminobenzyl-tert-butylamine obtained as described above was heated at reflux temperature for six hours. After neutralization with 25% sodium hydroxide solution the liberated tert-butylamine was removed by steam distillation. The oil remaining in the distilland was separated from the water and distilled in vacuo to give 3-methoxy-4,4'-diaminodiphenylmethane having a boiling point of 185 to 202° C. at 0.2 mm. of mercury.

Similarly using the above procedure, but replacing tert-butylazomethine by other azomethines such as (1,1-dimethylpropyl) - azomethine, (1 - methyl - 1-ethylbutyl) azomethine, (1 - methyl-1-phenylpropyl)azomethine, 1(1-methyl - 1 - benzylpropyl)azomethine, and the like, there is likewise obtained 3 - methoxy-4,4'-diaminodiphenylmethane.

B. 3-METHOXY-4,4'-DIISOCYANATODIPHENYLMETHANE

Using the procedure of Example 1, part B, the 3-methoxy - 4,4'-diaminodiphenylmethane obtained as described above was converted to 3-methoxy-4,4'-diisocyanatodiphenylmethane.

EXAMPLE 4

*3-ethoxy-4,4'-diisocyanatodiphenylmethane*

Using the procedure described in Example 2, part A, but replacing N-(4-nitrobenzyl)-o-anisidine by N-(4-nitrobenzyl)-o-ethoxyaniline, (prepared from o-ethoxyaniline and 4-nitrobenzyl chloride), there is obtained N-(4-aminobenzyl)-o-ethoxyaniline. The latter compound is converted, using the procedure described in Example 2, part B, to 3-ethoxy-4,4'-diaminodiphenylmethane, which is phosgenated, using the procedure described in Example 1. part B, to obtain 3-ethoxy-4,4'-diisocyanatodiphenylmethane.

Similarly, using the procedure described in Example 2, part A, but replacing N-(4-nitrobenzyl)-o-anisidine by N - (4-nitrobenzyl)-o-isopropoxyaniline, N-(4-nitrobenzyl) - o - butoxyaniline, and N-(4-nitrobenzyl)-o-octyloxyaniline (all of which are prepared from 4-nitrobenzylchloride and the appropriate o-alkoxyaniline) there are obtained N - (4-aminobenzyl)-o-isopropoxyaniline. N - (4 - aminobenzyl-o-butoxyaniline, and N-(4-aminobenzyl) - o - octyloxyaniline, respectively, which compounds are then converted, using the procedure described in Example 1, part B, to obtain 3-isopropoxy-, 3-butoxy-, and 3-octyloxy-4,4'-diisocyanatodiphenylmethane, respectively.

EXAMPLE 5

*3-methylthio-4,4'-diisocyanatodiphenylmethane*

Using the procedure described in Example 2, part A, but replacing N-(4-nitrobenzyl)-o-anisidine by N-(4-nitrobenzyl)-o-methylthioaniline, there is obtained N-(4-aminobenzyl)-o-methylthioaniline. The latter compound is converted, using the procedure described in Example 2, part B, to 3-methylthio-4,4'-diaminodiphenylmethane, which is phosgenated, using the procedure described in Example 1, part B, to obtain 3-methylthio-4,4'-diisocyanatodiphenylmethane.

Similarly, using the procedure described in Example 2, part A, but replacing N-(4-nitrobenzyl)-o-anisidine by N-(4-nitrobenzyl)-o-ethylthioaniline, N-(4-nitrobenzyl)-o-pentylthioaniline and N-(4-nitrobenzyl)-o-isohexylthioaniline (all of which are prepared from 4-nitrobenzyl chloride and the appropriate o-alkylthioaniline) there are obtained N-(4-aminobenzyl)-o-ethylthioaniline, N-(4-aminobenzyl)-o-pentylthioaniline and N-(4-aminobenzyl)-o-isohexylthioaniline, respectively, which compounds are then converted, using the procedure described in Example 2, part B, to 3-ethylthio-, 3-pentylthio-, and 3-isohexylthio-4,4'-diaminodiphenylmethane, respectively, and the latter are phosgenated, using the procedure described in Example 1, part B, to obtain 3-ethylthio-, 3-pentylthio, and 3-isohexylthio-4,4'-diisocyanatodiphenylmethane, respectively.

We claim:
1. 3-substituted diphenylmethane diisocyanates of the formula

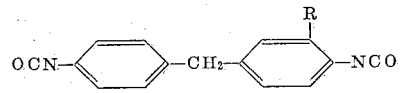

wherein R is selected from the group consisting of lower-alkoxy and lower-alkylthio.
2. 3-methoxy-4,4'-diisocyanatodiphenylmethane.
3. 3-methylmercapto-4,4'-diisocyanatodiphenylmethane.

References Cited

UNITED STATES PATENTS

| 2,683,144 | 7/1954 | Balon et al. | 260—443 X |
| 2,757,184 | 7/1956 | Pelley | 260—453 |
| 3,180,883 | 4/1965 | Case | 260—453 |
| 3,274,226 | 9/1966 | Long et al. | 260—453 |

OTHER REFERENCES

Cohn: Zeitschrift Für Ang. Chem., 1901, pp. 311–313.

CHARLES B. PARKER, *Primary Examiner.*

D. H. TORRENCE, *Assistant Examiner.*